United States Patent [19]
Patz et al.

[11] Patent Number: 4,486,490
[45] Date of Patent: * Dec. 4, 1984

[54] ELECTRICALLY CONDUCTIVE PREPREG MATERIALS

[75] Inventors: Gary L. Patz, Walnut Creek; Donald E. Davenport, Palo Alto, both of Calif.

[73] Assignee: Hexcel Corporation, San Francisco, Calif.

[ * ] Notice: The portion of the term of this patent subsequent to Nov. 18, 1997 has been disclaimed.

[21] Appl. No.: 174,299

[22] Filed: Jul. 31, 1980

Related U.S. Application Data

[62] Division of Ser. No. 7,096, Jan. 29, 1979, Pat. No. 4,234,648.

[51] Int. Cl.³ .............................................. B32B 7/00
[52] U.S. Cl. ................................ 428/245; 427/383.5; 428/246; 428/251; 428/257; 428/260; 428/263; 428/273; 428/388; 428/902
[58] Field of Search ............... 427/121, 404, 383.5; 428/245, 251, 246, 260, 263, 273, 388, 902, 257, 258, 259

[56] References Cited

U.S. PATENT DOCUMENTS

| | | | |
|---|---|---|---|
| 3,310,457 | 3/1967 | Trebilcoch | 428/251 |
| 3,320,083 | 5/1967 | Rusch | 428/251 |
| 3,437,457 | 4/1969 | Fisher | 428/251 |
| 3,443,021 | 5/1969 | Schrader | 428/251 |
| 3,446,661 | 5/1969 | Anderson | 428/251 |
| 3,660,138 | 5/1972 | Gorrell | 428/251 |
| 3,661,538 | 5/1972 | Brown et al. | 428/251 |
| 4,234,648 | 11/1980 | Patz et al. | 428/246 |

FOREIGN PATENT DOCUMENTS 1159994 7/1969 United Kingdom .
1394681 5/1975 United Kingdom .

Primary Examiner—James J. Bell
Attorney, Agent, or Firm—Townsend and Townsend

[57] ABSTRACT

A novel electrically and thermally conductive prepreg is provided comprising a resin impregnated fabric woven from a multiplicity of dielectric fibers at least some of which are metal-coated, e.g. aluminum-coated glass fibers. Articles made therefrom are useful for dissipation of static electricity, lightening strike protection, EMI shielding and antennae surfaces. Directional conductivity is achieved by orientation of the metal-coated fibers in the ply.

13 Claims, 4 Drawing Figures

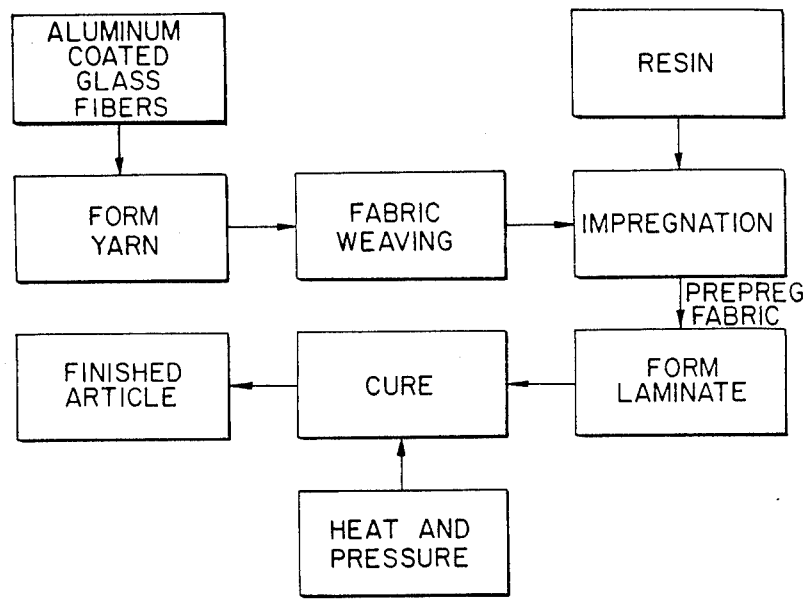
FIG._1.
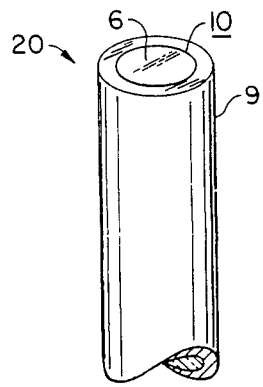
FIG._2A.
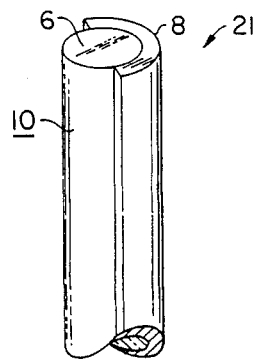
FIG._2B.
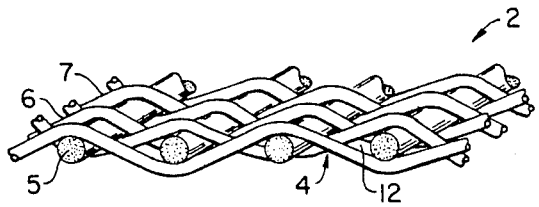
FIG._3.

ELECTRICALLY CONDUCTIVE PREPREG MATERIALS

This is a division of application Ser. No. 007,096, filed Jan. 29, 1979 now U.S. Pat. No. 4,234,648.

BACKGROUND OF THE INVENTION

This invention relates to novel resin impregnated fabrics which are both thermally and electrically conductive, and more specifically, to resin impregnated fabrics woven from aluminum coated glass fibers.

It is known to fabricate structural elements or parts from resin/fiber composite systems in which the fibers provide the mechanical strength and the resin serves as a matrix to maintain the fibers in alignment. The fiber material is often in the form of a fabric woven from yarn, ie. relatively loose strands of twisted or untwisted fibers. Typically the fibers may be made of glass, or other reinforcing materials having the desired characteristics. The fabric is then impregnated with a suitable resin, such as an epoxy, polyester, polyimide or polysulfone resin, to form what is known as prepreg material (prepreg) which, generally speaking, comprises flat sheets of fabric impregnated with uncured resin. Layers of prepreg are typically laminated and cured at an elevated temperature and pressure to form the desired article.

Prepreg may be used to fabricate molded parts, as well as flat sheets for use, for example, when making honeycomb sandwich materials. To form the finished product or part, the prepreg is laminated by applying heat and pressure to multiple overlaying layers of prepreg in a mold or a so-called "lay-up".

Prepreg materials wherein the fibers are made of glass are particularly well adapted for high strength/lightweight applications, for example, in the aircraft and aerospace industries. In such a composite the material acts as reinforcement adding mechanical strength.

For many applications present prepreg laminate materials are unsuitable because of their poor electrical conductivity, i.e. high dielectric characteristics. For example, in the field of structural materials, it is well known that plastic surfaces are subjected to a build-up of static electricity. The usual solution is to coat the surface with a conductive paint. Similarly, electronic instruments require EMI shielding. Because of the dielectric characteristics of prepregs, metals or other electrically conductive materials are presently used for such casings. Also, to render plastic surfaces reflective, as is required for dish-antennae, for example, the surfaces must be flame sprayed with aluminum or a similar material if the dish-antennae are constructed of prepreg.

Thus, as a result of their lack of thermal or electric conductivity, plastic materials in general and prepregs in particular are either unusable for certain applications or they require a special treatment of their surfaces, normally the application of a separate coating. Where the electric and thermal characteristics of prepreg prevent its use altogether, an otherwise advantageous, e.g. inexpensive and readily worked, material is lost. Where the prepreg material requires the application of surface coatings and the like to give it the required conductivity, the cost of the finished product is increased. More importantly, surface coatings require periodic maintenance and/or replacement which adds to the cost of using such products and, unless conscientiously performed, may render the products inoperative until the surface coating has been repaired or replaced. Further, the additional weight of a conductive surface coating can be a significant disadvantage, e.g. in the aerospace industry. As a result, other materials, primarily metals, continue to be extensively used for applications where plastic materials and in particular prepregs could be advantageously employed from a structural point of view.

Thermal conductivity is applicable to better permit heat transfer, e.g. during heat molding operations. Thermal conductivity may also be applicable for heat dissipation, for example in electrical circuitry.

Accordingly it would be desirable to have a prepreg material which could be structurally utilized and which has the necessary electric and thermal conductivity so that it can be employed for the dissipation of static electricity for EMI shielding, as a lightning strike protection, for reflective surfaces, etc.

SUMMARY OF THE INVENTION

The present invention allows for the above summarized advantageous use of prepreg materials, in that it provides a prepreg material which has both good thermal conductivity and good electrical conductivity. More particularly, the present invention provides a prepreg material which includes a fabric woven from a multiplicity of fibers constructed of a dielectric material, e.g. glass, at least some of which have been at least partially coated with an electrically conductive material, e.g. a metal such as aluminum, and an uncured resin carried by the fabric. Prepreg materials of the present invention are light-weight structural materials which are a relatively inexpensive and easy to use substitute for metal sheets, or conventional prepregs coated with reflective or conductive paint and the like. For example, prepreg materials of the present invention can be substituted for conductive paint to render the surface of conventional prepregs conductive without adding weight by forming at least the outer ply of aluminum coated fabric.

Prepreg materials of the present invention are woven from continuous yarns which are bundles of dielectric fibers at least some of which have been at least partially coated with an electrically conductive material, such as a metal, typically aluminum. Depending on the characteristics desired in the prepreg there may be incorporated into the yarns other fibers, such as uncoated glass fibers. Normally, it is necessary to twist the continuous yarns about themselves prior to weaving to permit them to be handled during the weaving operation. Similarly, depending on the desired characteristics, continuous yarns comprising metal coated fibers may be woven in one or both directions, i.e. as either or both the fill and the warp of the fabric, to thereby impart to the prepreg a directionalized electric or thermal conductivity.

Prepreg material constructed in accordance with the present invention generally exhibits all the mechanical characteristics of conventional prepreg materials. In addition, it has electric and thermal conductivity to permit its use for a wide range of applications for which conventional prepregs were considered either unsuited or required special treatment.

Thus, the prepreg material of the present invention can be employed for the dissipation of static electricity which may accumulate on the surface of an article by constructing at least the outermost prepreg layer of a fabric woven from aluminum coated glass fibers. The prepreg of the present invention can further be utilized to provide reliable EMI shielding for electronic instruments to replace the heretofore common metal shielding. The shielding afforded by the prepreg of the present invention substantially enhances the manufacture of such shielding because prepreg is easier and less expensive to form than metals presently in use and further because the prepreg has a wider design range than metal. The prepreg material of the present invention can further be used as a structural prepreg to replace structural aluminum mesh screens for certain lightning strike applications, particularly on aircraft skins. Further, because of the firm bond between the glass fibers and the metal coating applied thereto, the prepreg functions as a built-in heat sink for the electrically conductive metal coating which greatly enhances the current that can be carried by it, particularly if the current is applied for relatively short durations.

Thus, the present invention makes it feasible to convert an otherwise dielectric prepreg material into an electrically and thermally conductive material by precoating the fibers which are then woven into a fabric for the prepreg. Consequently, the prepreg can be rendered electrically conductive without mixing metal strands, metal spheres and the like into the resin as was heretofore sometimes attempted and which adversely affects the structural integrity of the prepreg.

BRIEF DESCRIPTION OF THE DRAWINGS

FIG. 1 is a flow diagram which schematically illustrates the method of forming articles from resin impregnated fabrics made of aluminum coated glass fibers in accordance with the present invention;

FIGS. 2A and 2B, respectively, are cross-sectional views of a glass fiber which is entirely and partially coated with aluminum.

FIG. 3 is a schematic side elevational view, in cross-section, of a prepreg material made in accordance with the present invention.

DESCRIPTION OF THE PREFERRED EMBODIMENTS

Referring to the drawings and first to FIGS. 2A, 2B and 3, the present invention is particularly concerned with the manufacture of a prepreg material 2 that has a relatively high electric and thermal conductivity. The prepreg material is defined by a woven fabric 4 and uncured resin carried by the fabric and it is subsequently manufactured into a product or article in an essentially well-known manner. Briefly, a mold (not separately shown in the drawings) which has the desired shape of the finished article is prepared and one or more sheets of prepreg material, commonly referred to as "layers" or "plies", are placed over the mold. The prepreg plies are relatively limp and thus drape over and generally conform to the shape of the mold. In accordance with well-known techniques, the prepreg plies are then sufficiently heated to effect a curing of the resin and pressure, normally fluid pressure, is simultaneously applied so as to assure an exact conformity of the prepreg material to the mold and effect a cross-flow of resin between the plies to intimately bond the plies to each other and to thus structurally integrate them.

Conventional fabric used for the fabrication of prepreg material is made by weaving individual fibers, (untwisted) fiber bundles, or (twisted) fiber yarns in the desired pattern and density. A widely used fabric comprises glass fibers, such as E-glass fibers commercially available from the Hexcel Corporation of Dublin, Calif.

Such fabrics, the resulting prepreg material and the ultimate product exhibit poor electric and thermal conductivity since the fibers are usually constructed of a dielectric material. To render the fibers and therewith the prepreg and the product electrically conductive the present invention applies an electrically conductive, e.g. metal, coating such as an aluminum coating 8, 9 to the outer surface 10 of each fiber 6. Although the coating 9 may extend over the entire exterior surface 10 of the fibers (as shown in FIG. 2A), in the presently preferred embodiment of the invention the aluminum coating 8 extends over only a portion of the outer fiber surface 10, preferably over about one-half of the circumference of the surface (as shown in FIG. 2B) so that the aluminum coating effectively defines a troughshaped metallic shell 8 which has an inner diameter equal to the outer diameter of the fiber, which receives the fiber and which extends over the entire length of the fiber.

Although the fabrication of the fibers 6 per se does not form part of the present invention, and the aluminum coating 8, 9 can be applied in any desired manner so long as it firmly adheres to the surface of the fibers, it is preferred that the coating be applied by dipping continuous glass fibers in molten aluminum. In this manner the applied aluminum film is less uniform (as compared to a film applied by vapor deposition, for example), resulting in a non-uniform film thickness and a relatively uneven or irregular film surface. Such an uneven surface in turn establishes a better bond between the aluminum film and the resin of the prepreg than films having smooth surfaces. Metal-coated fibers constructed in this manner are available from MB Associates of San Ramon, Calif. under its trademark, Metafil G.

The coated fibers 20, 21 are preferably supplied in long, continuous lengths of up to several thousand yards to facilitate their subsequent weaving and to ensure a continuous electric conductor over the full length of the woven fabric. Further, the fibers are preferably half coated (see FIG. 2B) because of the better mechanical strength of the half coated fiber with no significant difference in electrical properties. Typically, the fibers of the present invention will be continuous, essentially endless fibers having diameters of from about 0.5 to 1.0 mil and an aluminum coating thickness of about 0.05 to 0.2 mil.

The fibers have an extraordinary current carrying capability in the region of ten microseconds to one millisecond because of the excellent coupling, i.e. intimate bonding, which takes place between the aluminum and glass. Consequently, the glass can serve as a heat sink. For example a 0.7 mil glass fiber with a 0.1 mil aluminum coating exhibits a heat capacity of twice that of the aluminum up to the melting point of the aluminum. Thus, for short time periods metal coated fibers are more efficient as a current carrier than 200 mesh aluminum screen with about the same aluminum content.

The particular fabric construction, i.e., the weave, is not critical. Virtually any fabric construction typical of prepregs can be utilized. Initially, a bundle 5 of aluminum coated glass fibers 20, 21 is twisted into a fiber yarn of essentially unidirectional fibers or two or more bundles are twisted about themselves into a yarn. Uncoated fibers may be made of the above mentioned E glass or of other materials such as a high temperature aramide available from I. E. duPont, under its trademark Kevlar.

Next, the yarns are woven into a fabric 4 by employing any desired combination of coated and/or uncoated fiber yarn. For example, hybrid yarns, i.e. aluminized and non-aluminized yarns twisted about themselves can be used in one direction, e.g. as the fill, of the weave while non-aluminized twisted glass yarns are utilized in the transverse direction, e.g. as the warp. Depending on the yarn material and the intended use, the fabric may be a mat or web of relatively open weave having relatively large interstices 12 between the yarns, or it may be a close weave fabric with relatively small or essentially no interstices.

The fabric is then impregnated with resin to form a prepreg fabric material, the resin being deposited onto the fabric from a solution in a conventional manner. Resins adapted for use with the present invention are uncured or partially cured resins, i.e. thermosetting resins which are not at all or only partially polymerized and high temperature thermoplastic resins such as polysulfones which, at the encountered temperatures act like thermosetting resins i.e. are moldable at elevated temperatures but hard at temperatures of use. For purposes of this disclosure and the claims the terms "cured resin" and "uncured resin" therefore also include thermosetting resins as well as thermoplastic resins which act in the above manner. The proportion of resin generally depends on the materials involved and the desired end use.

The proportion of resin to fiber is dictated by the strength-to-weight requirements of the fabricated parts. In particular, since the tensile strength comes from the fiber rather than the resin, a low resin content is desirable. While the proportions will vary according to the materials and the application, a cured prepreg sheet comprising a woven fabric (made of partially aluminum coated glass fibers) impregnated with a 250° F. curing epoxy resin should contain approximately 30–50% resin by weight. The prepreg layer may be rolled and/or laminated with other such layers depending on the characteristics of the prepreg desired.

Now referring to the FIG. 1 of the drawings, the overall process for making a finished, thermally and electrically conductive article from resin impregnated material (prepreg) is described. Initially, aluminum coated glass fibers (see FIGS. 2A and 2B) are formed into a yarn or bundle of, generally at least 45 and no more than 540, preferably 45 to 180, essentially unidirectional fibers. The yarn can, additionally contain fibers of other materials such as uncoated glass fibers. The bundle of fibers is then twisted to enhance its weavability. Since the present invention is particularly well adapted for use with partially aluminum coated glass filaments, the further description of the invention will be so directed. Next, the yarn of aluminum coated fibers is woven into a fabric as the yarn in one or both directions, i.e. as either or both the fill and the warp of the fabric.

Referring momentarily to FIG. 3. the fabric is a motor web defined by transverse, e.g. perpendicular yarns 5, a first series of which extends in a longitudinal direction and a second series of which extends in a transverse direction. The yarns define between each other generally square interstices.

Referring again to FIG. 1, the woven fabric is impregnated with resin to form a prepreg fabric material, the resin being deposited into the fabric from a solution. In a preferred embodiment of the invention, an aluminum coated glass fabric is impregnated with an amount of resin which generally represents approximately 35%–42% by weight of the prepreg material.

Thereafter, the prepreg material is laminated by placing at least two layers over each other in a mold or lay-up. Heat and pressure are applied to the prepreg to cure the resin and to thereby form the finished article. Depending on the particular characteristics desired in the prepreg laminate, some of the layers may comprise aluminum coated fibers according to the present invention, while other layers may comprise other prepreg materials. For example, in applications, such as those wherein a layer of conductive paint has heretofore been employed, i.e. where enhanced conductivity is desired on the surface, only the top prepreg layer or layers of the laminate may comprise conductive prepregs of the present invention.

It has been determined that two layers of prepreg material treated as above-described, each material layer having a thickness of no less than about 4 mils and no more than about 30 mils and a resin content or no more than about 50% by weight of the prepreg material, can be molded into a thin-walled (e.g. approximately 14 mils thick) finished article which has electric as well as thermal conductivity.

The following examples are provided by way of illustration and not by way of limitation.

EXAMPLE 1

Conductive fiber yarn comprising 22 aluminum coated glass fibers and 23 noncoated glass fibers (22/45) in which the glass fiber diameter was approximately 0.8 mils with the aluminum coated glass fibers having approximately 40% by weight aluminum coated around one-half the circumference of the fibers was twisted with 150 denier single (150 1/0) yarn. This was then used as the fill in weaving a cloth on the following construction:

Warp—two 150 denier glass yarns (150 1/2) (nonconductive)
Fill—150 1/0//22/45 (conductive)
Weave—8 harness satin
Weight—8.6 oz/yd$^2$ The fabric was then impregnated using conventional solution coating techniques with a 250 degrees F. curing epoxy resin to form a single ply conductive prepreg. The single ply conductive prepreg was then laminated and cured onto 4 plies of conventional epoxy/E-glass prepreg layers and tested for surface resistivity. The unit resistivity ranged from 0.006 to 0.02 ohm-cm.

EXAMPLE 2

Twelve piles of conductive prepreg constructed in accordance with Example 1 (with conductive yarn in fill direction) were laminated together and cured after which they exhibited the following mechanical properties.

|  | Warp (psi) | Fill (psi) | Test Method |
| --- | --- | --- | --- |
| Tensile Strength | 65,000 | 37,200 | FTMS 1031 |
| Tensile Modulus | $3.75 \times 10^6$ | $3.35 \times 10^6$ | |
| Compressive Strength | 68,200 | 61,500 | ASTM D-695 |
| Compressive Modulus | $3.8 \times 10^6$ | $3.87 \times 10^6$ | |

What is claimed is:
1. A prepreg material comprising a web defined by a multiplicity of elongated fiber bundles arranged to sub- stantially cover the entire surface area of the web, individual fibers of the bundles being constructed of a dielectric material, at least some of the individual fibers in at least some of the bundles of the web having an individual metallic surface coating extending over substantially the full length of said some fibers, and an uncured, curable resin applied to the web to form a resin impregnated prepreg material that is readily deformable; whereby the prepreg material can be transformed into a rigid article exhibiting conductivity supplied by the metallic coating by appropriately shaping the prepreg material and, while in the desired shape, curing the resin to rigidify the material in the desired shape.

2. A prepreg material according to claim 1 wherein the bundles are woven and the web comprises a woven fabric.

3. A prepreg material according to claim 2 wherein the bundles are transversely oriented to define the weave and warp of the fabric.

4. A prepreg material according to claim 3 wherein the individual fibers have a sufficient length so that they traverse at least a plurality of bundles which are transversely oriented.

5. A prepreg material according to claim 1 wherein the metallic coating on the fibers extends over less than the full circumference of the fibers.

6. A prepreg material according to claim 1 wherein the individual fibers have a sufficient length so that they extend across substantially the entire surface area of the web.

7. Prepreg material comprising a multiplicity of fiber bundles woven into a fabric formed of transversely oriented, separate fiber bundles defining the weave and the warp of the fabric, individual fibers of the bundles being constructed of a dielectric material, at least some of the individual fibers in at least some of the bundles of the fabric having a metallic surface coating extending over substantially the full length of said some fibers, and an uncured, curable resin applied to the fabric to form a resin impregnated fabric that is readily deformable; whereby the prepreg material can be transformed into a rigid article exhibiting conductivity supplied by the metallic coating by appropriately shaping the prepreg material and, while in the desired shape, curing the resin to rigidify the material in the desired shape.

8. An article of manufacture including, a relatively lightweight, high strength and relatively thin shell made by appropriately shaping a prepreg material comprising: a web defined by a multiplicity of elongated fiber bundles, each bundle comprising a plurality of individual fibers, the bundles being arranged to substantially cover the entire surface area of the web, a curable resin applied to the web in its uncured state and cured after the web has been appropriately shaped so that the cured resin embeds and thereby rigidly interconnects individual fibers of the bundles as well as the individual bundles of the article, the individual fibers being constructed of a dielectric material, at least some of the individual fibers of at least some of the bundles having a relatively thin metallic coating intimately bonded to an outer surface of said some fibers, the coating extending over substantially the full length of said some fibers; whereby the metallic coating imparts conductivity to the article of manufacture.

9. A prepreg material comprising a web defined by a multiplicity of elongated fiber bundles arranged to substantially cover the entire surface area of the web, individual fibers of the bundles being constructed of a dielectric material and having a sufficient length so that they extend across substantially the full surface area of the web, at least some of the individual fibers in at least some of the bundles of the web having an individual metallic surface coating extending over substantially the full length of said some fibers, and an uncured, curable resin applied to the web to form a resin impregnated prepreg material that is readily deformable; whereby the prepreg material can be transformed into a rigid article exhibiting conductivity supplied by the metallic coating by appropriately shaping the prepreg material and, while in the desired shape, curing the resin to rigidify the material in the desired shape.

10. Prepreg material comprising a multiplicity of fiber bundles woven into a fabric formed of transversely oriented, separate fiber bundles defining the weave and the warp of the fabric, individual fibers of the bundles being constructed of a dielectric material and having a length substantially equal to the length of the respective bundles, at least some of the individual fibers in at least some of the bundles of the fabric having a metallic surface coating extending over substantially the full length of said some fibers, and an uncured, curable resin applied to the fabric to form a resin impregnated fabric that is readily deformable; whereby the prepreg material can be transformed into a rigid article exhibiting conductivity supplied by the metallic coating by appropriately shaping the prepreg material and, while in the desired shape, curing the resin to rigidify the material in the desired shape.

11. A method of manufacturing a thermally and electrically conductive prepreg material comprising the steps of providing fibers constructed of a dielectric material, applying to at least some of the fibers a metallic surface coating extending over at least part of the circumference and over substantially the full length of said some fibers; thereafter forming fiber bundles with the fibers, each bundle comprising a plurality of individual fibers, at least some of the fibers in at least some of the bundles having the metallic surface coating; thereafter combining the bundles to form a web so that the bundles extend over substantially the full surface area of the web; and contacting individual fibers of the bundles as well as the bundles with a curable, uncured resin.

12. A method according to claim 11, including the step of imparting to the web a predetermined shape, and curing the resin while holding the web in such shape to thereby form a thin-walled, rigid article of manufacture.

13. A method according to claim 11 including the step of giving the individual fibers a sufficient length so that they extend across substantially the full surface area of the web.

* * * * *